United States Patent [19]

Takewell et al.

[11] 4,050,869
[45] Sept. 27, 1977

[54] APPARATUS FOR AGGLOMERATING POWDERS

[75] Inventors: Robert B. Takewell, Borger, Tex.; Paul W. Brandon, Havre de Grace, Md.; Paul R. Odom, Macon, Ga.

[73] Assignee: J. M. Huber Corporation, Locust, N.J.

[21] Appl. No.: 668,120

[22] Filed: Mar. 18, 1976

Related U.S. Application Data

[60] Continuation of Ser. No. 450,037, March 11, 1974, abandoned, which is a division of Ser. No. 186,113, Oct. 4, 1971, Pat. No. 3,803,283.

[51] Int. Cl.$^2$ ............................................. B29B 1/02
[52] U.S. Cl. ..................................... 425/222; 264/117
[58] Field of Search ..................... 425/222, 332, 402; 264/117

[56] References Cited

U.S. PATENT DOCUMENTS

| | | | |
|---|---|---|---|
| 1,980,130 | 11/1934 | Fasting | 425/222 X |
| 1,994,718 | 3/1935 | Tellep | 425/222 |
| 2,268,816 | 1/1942 | Gabeler et al. | 425/222 |
| 2,674,522 | 4/1954 | Takewell et al. | 425/222 |
| 2,871,510 | 2/1959 | Sackett | 425/222 |
| 2,979,421 | 4/1961 | Ressman et al. | 425/222 X |
| 3,277,218 | 10/1966 | Dollinger | 264/117 X |
| 3,460,195 | 8/1969 | Erickson | 425/222 |
| 3,555,133 | 1/1971 | Gentag | 264/117 X |
| 3,682,569 | 8/1972 | Vagin et al. | 425/222 X |

Primary Examiner—Robert L. Spicer, Jr.
Attorney, Agent, or Firm—Harold H. Flanders; Ernest A. Schaal

[57] ABSTRACT

Apparatus for agglomerating powders and non-flowing fine particle minerals such as clay, silicas, and silicates involving means for establishing a minimum level of wetting agent content in the material to be agglomerated, a rotatably mounted motor driven drum for tumbling the material to be agglomerated over itself, spray nozzles located within the drum to add additional wetting liquid to the material within the drum, and conveying means for passing the material into the drum and discharge means for removing the agglomerated powder, which is now formed into pellets of an advantageous pellet size distribution, therefrom. The spray nozzles are situated to spray the wetting agent onto the material at the curl thereof. The establishing of a minimum level of wetting agent content in the powder, preferably in the range of 1-1/2% to 5%, is achieved either by incomplete drying of the material during wet processing or by the application of a wetting agent prior to introduction into the drum.

1 Claim, 13 Drawing Figures

VIEW CC

VIEW B-B

VIEW A-A

APPARATUS FOR AGGLOMERATING POWDERS

CROSS REFERENCE TO RELATED CASES

This is a continuation of application Ser. No. 450,037, filed Mar. 11, 1974, now abandoned. And, which application was a divisional application of U.S. Ser. No. 186,113 entitled "Agglomerating Powders" filed Oct. 4, 1971 by Robert B. Takewell, Paul W. Brandon, and Paul R. Odom now U.S. Pat. No. 3,803,283 granted Aug. 9, 1974.

BACKGROUND OF THE INVENTION

In general, the present invention involves agglomeration of finely divided material and more specifically relates to an apparatus for wet pelletizing finely divided minerals and like substances into pellets of an advantageous pellet size distribution which achieves optimum bulk density with free flowing characteristics for shipping, packaging, and storing and reduces the amount of fines present while maintaining high dispersibility of the product.

Many powdery materials such as degritted and delaminated dry clay are dusty, non free-flowing and have a low bulk density of around 25 pounds per cubic foot. In order to induce such materials to flow from tanks, hoppers and chutes and other containers, vibrators, air pads, or hammers have to be used in order to prevent the fluffy material from caking or bridging. A finely divided material such as refined clay is very dusty in the dry state and, even with the best of air-tight containers and shipping vessels, much loss of the product and contamination of the surrounding environment occurs.

Apparatus revealed by the prior art for agglomerating finely divided powders include pin mixer type pelletizers and rotating tilted pan pelletizers. Materials pelletized in these devices achieve a fairly good compaction but produce pellets which are friable and substantially uniform in size. Also these devices produce fines and dust along with the pellets so that the dust problem is only reduced and not eliminated. The pellets are denser than the powdery material but not of the optimum density for shipping and dispersion.

The prior art has suffered from the difficulty of obtaining a pellet size distribution which allows the pellets to be placed in containers and storage vessels in the most compact manner. For example, pour densities of kaolin clays pelletized by methods of the prior art such as those disclosed by U.S. Pats. Nos. 3,446,218, 3,542,534, 3,460,195 and 2,758,039, usually range from 50 to 55 pounds per cubic foot, whereas the kaolin clays pelleted by the present invention exhibit pour densities in the range of 60 to 70 pounds per cubic foot.

Other deficiencies of the prior art processes include the high rate of attrition among the individual pellets in their containers which results in a large amount of undesirable fines. In order to reduce the attrition rate and prevent material loss and plant contamination due to excessive fines content, some of the prior art devices are designed to produce a hard pellet. While in some instances this serves to reduce the loss to fines, it always results in a pellet which is difficult to fracture and disperse into the final product such as paint, paper, ink, rubber, etc.

Also, the prior art processes include methods which call for adding all of the moisture for pelletizing to the substance before it is introduced into the pelletizer. This procedure even further reduces the flowability of the material and necessitates special conveying equipment such as screw conveyors to move the material from the wetting chamber to the pelletizer. Since the wetted material, having from 5 to 20% or higher moisture level, is especially susceptible to caking in the moist state, it is difficult to convey smoothly.

Other existing devices add all of the water of pelletization to the material while it is in the pelletizer. This results in a dry powdery product being introduced into the pelletizer which causes a large amount of dust in and around the pelletizer arising from the powdery material becoming airborne. Also the completely dry material in the pelletizer is more difficult to wet evenly than would be a slightly damp material just as a dry sponge is less absorbent than a slightly damp one.

SUMMARY OF THE INVENTION

Accordingly it is an object of this invention to provide new and highly effective apparatus for pelletizing powdered or finely divided material and overcoming the deficiencies of the prior art noted above.

It is further an object of this invention to provide an agglomerating device which produces an optimum pellet size distribution for maximum bulk density with free flowing characteristics of the agglomerated material.

It is also an object of this invention to reduce the amount of material loss through attrition and fines in the pelletizer and in the shipping container.

It is still a further object of this invention to provide a device for agglomerating loose material into pellets which are easily dispersed in the final products in which they are used.

It is another object to densify powdered material into agglomerates which are free-flowing and non-dusting.

Other objects and a fuller understanding of the invention may be had by referring to the following description and claims taken in conjunction with the accompanying drawings.

The present invention overcomes the deficiencies of the prior art and achieves its objectives by providing novel apparatus for producing an agglomerated product which most efficiently utilizes shipping space by filling up the voids which naturally occur between spherically shaped equal-sized particles packed in bulk containers such as bags, boxes, tanks, or railroad cars, and which exhibits free-flowing characteristics with negligible dusting.

BRIEF DESCRIPTION OF THE DRAWINGS

In order to facilitate the understanding of this invention, reference will now be made to appended drawings of preferred embodiments of the present invention. The drawings should not be construed as limiting the invention but are exemplary only.

In the drawings.

DESCRIPTION OF THE PREFERRED EMBODIMENTS

Figure 1:
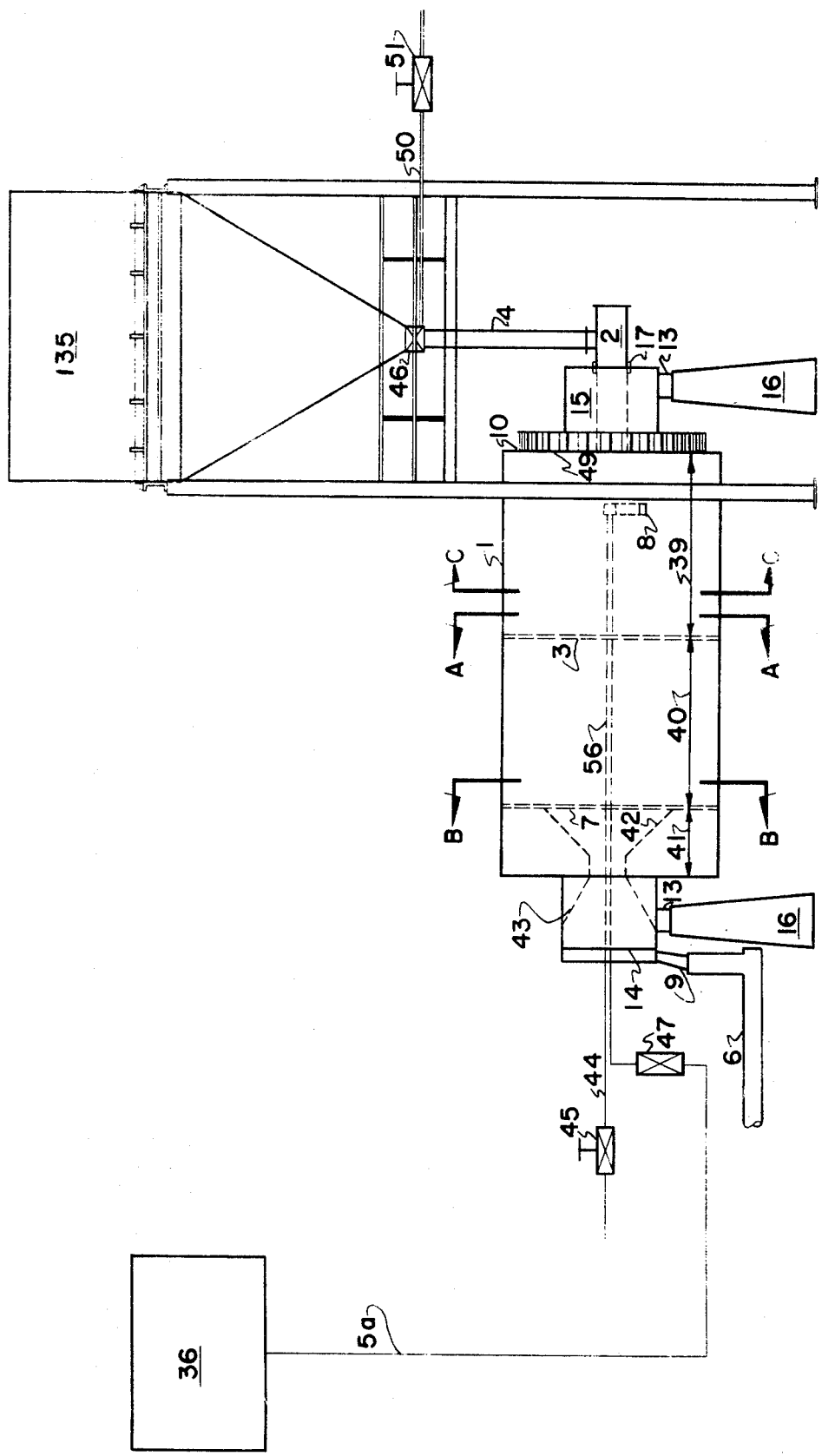
FIG. 1 is a diagram of the pelletizing process of the present invention.

A preferred embodiment of the present invention is shown in FIG. 1 in which a storage tank 135 supplies a finely divided material such as clay, silica, silicates, etc., containing from 1½ to 5 per cent moisture, to a conveyor system 2 through a supply line 4. The material passes through rotary feeder valve 46 and is then conveyed by conveyor or pin auger 2 to a right circular cylindrical rotating drum 1.

A moisture level of 1½ to 5 per cent in the material to be pelletized is obtained by incomplete drying of the material during wet processing or by adding moisture to the dry product prior to pelletizing. For instance in the clay industry, a raw kaolin clay, after being mined, is suspended in an aqueous slurry and degritted, classified and/or delaminated and then dried. In applying the agglomerating process of this invention, the clay slurry is only partially dried to the extent that it contains from 1½ to about 5 per cent moisture, and then it is agglomerated according to the teachings of the present invention.

If the powdered material contains less than 1½ per cent moisture then a sufficient amount of wetting liquid can be applied to it prior to entering the drum as for example, in pin auger 2, to bring its moisture level up to 1½ to 5 percent. The finely divided material to be agglomerated, having the minimum amount of moisture in it, is added to the pelletizing drum 1 and is further wetted by spray nozzle 8 as it is tumbled. The pre-added moisture induces the finely divided material to more readily accept the bulk of the wetting liquid added in the drum 1. The pre-wetting also results in a reduction of dust in the drum and conveying systems. It also provides an easily flowing blend which is less susceptible to caking.

The material in the drum receives the remainder of wetting liquid through pelletizer liquid supply line 56 which feeds the liquid to spray nozzle 8 located within the drum 1. The liquid is sprayed from spray nozzle 8 onto the material and the material is pelletized by the rotating motion of the drum 1 and is passed through the drum outlet 14 to the pellet conveyor 6. The drum 1 has removable manholes 66, shown in FIG. 2, opening into the drum to allow access to the inside of the drum for maintenance. The manholes 66 can also be used to purge material from the drum when changing operation from one type of material to another or changing grades of material.

Figure 2:
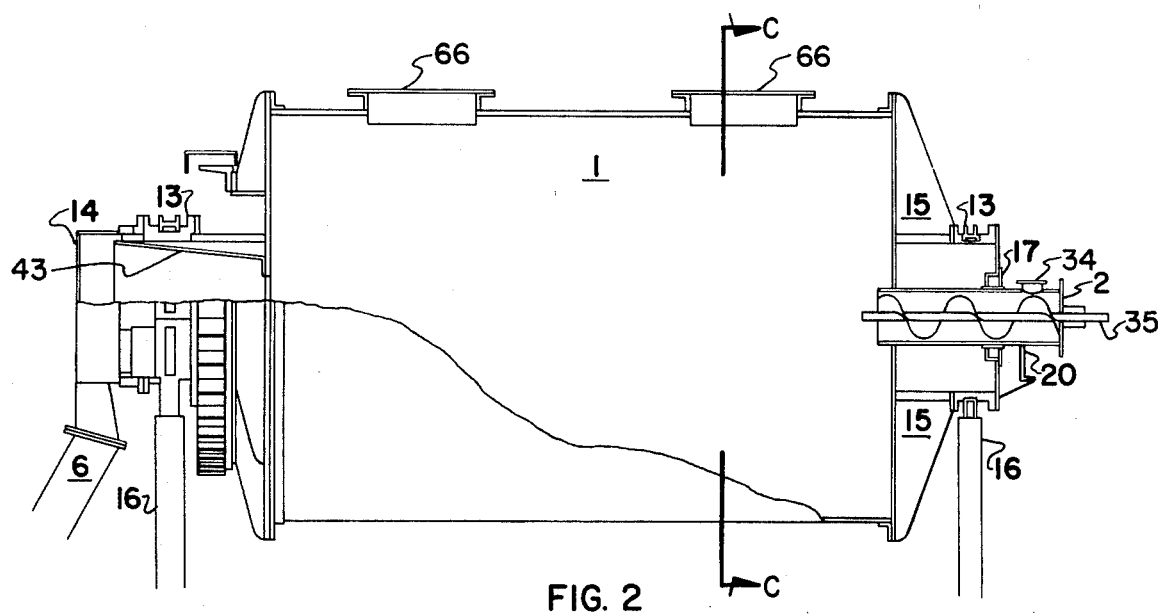
FIG. 2 is a partially cutaway slide view of a rotating drum pelletizer of the present invention.
Figure 4:
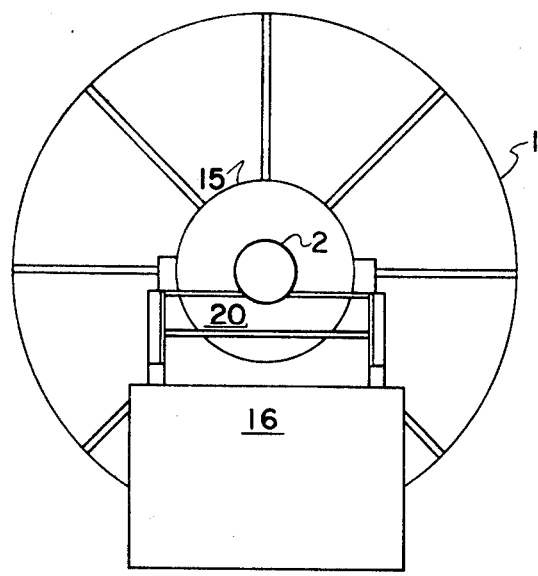
FIG. 4 is an external view of the inlet end of the pelletizer drum of the present invention.

Referring to FIGS. 2 and 4, the rotating drum 1 receives material through drum inlet 15 which is a substantially cylindrical section permanently attached to one end of the drum and is supported by floor supports 16 and rotatably attached to the floor supports 16 by trunion bearings 13. A conveyor 2 such as a screw conveyor passes concentrically through the drum inlet 15 to bring material into the drum. A closure is obtained by lubricated bushings 17 between the conveyor 2 and the inlet 15.

In the drum 1 perpendicular to the longitudinal axis are baffles 3 and 7, FIG. 1, containing openings to allow the material to progress through the drum. The baffles divide the drum into three chambers to provide three different functions. Baffle 3 is located near the middle of the drum length and forms the pelletizing chamber 39 at the inlet end of the drum. Baffle 7 divides the remaining portion of the drum into two chambers, a polishing chamber 40, and a discharge chamber 41 containing one or more lifter trays 42.

At the downstream end of the drum 1, the drum outlet 14 may contain a tapered or right cylindrical discharge cone 43 concentrically located within outlet 14 to allow finished pellets to flow into discharge spout 9. From the discharge spout 9, the pellets drop into pellet conveyor 6 to be removed from the pelleting drum area.

A wetting liquid is supplied to spray nozzle 8 through line 56 and may consist of water and/or steam or air. Water is supplied from tank 36 through line 5a and a rotameter 47. Steam or air enters through steam-air line 44 and steam-air valve 45.

Figure 3:
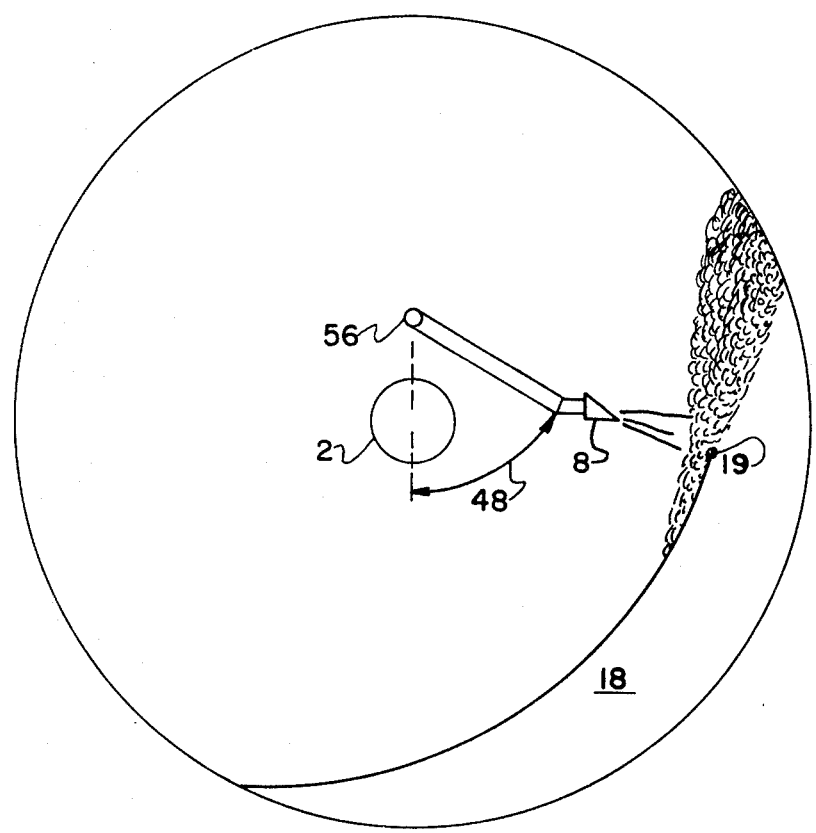
FIG. 3 is a cross-sectional view of the rotating drum pelletizer of the present invention taken at section line C-C of the drum, and in the direction indicated.

In FIG. 3, the pelletizer drum 1 contains a bed of material 18 being pelletized by continuously tumbling down the side of the shell. At the point 19 on the inner surface of the bed 18 when the material begins to break loose from the bed and tumble down towards the bottom of the shell, due to the increasing angle of repose, force of gravity, and forces arising from the drum rotation, the wetting liquid is most advantageously sprayed. This point 19 is referred to as the "curl" in the tumbling bed of material 18.

The spray attitude angle 48 is the angle the spray makes with a vertical line through the axis of rotation of the drum 1. This angle is preferably around 45°–50° but can range from 35° to 85° depending upon the speed of rotation of the drum and the material being agglomerated. At a drum speed of 6 rpm, the preferable angle is around 45°.

The spray of liquid is directed at the material near the upstream end 49 of the drum 1 but is not allowed to contact the end 49.

In FIGS. 2 and 4, the drum 1 has a concentrical inlet section 15 which is permanently attached thereto and rotates with the drum. A nonrotating conveyor system 2 passes concentrically through the inlet section 15 and is attached thereto by lubricated bushings 17. The conveyor system 1 is supported by support 20 passing beneath it.

Figure 5:
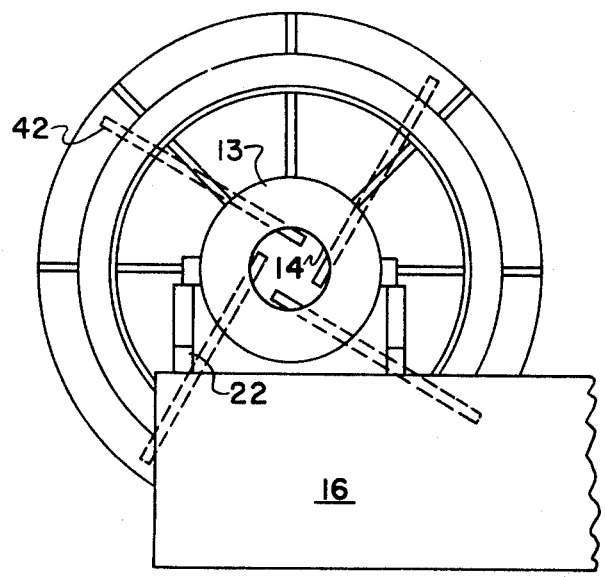
FIG. 5 is an external view of the outlet end of the pelletizer drum.

FIGS. 2 and 5 disclose the pellet outlet 14 concentrically located in the end 21 of the drum. Floor support 16 supports brackets 22 which support the trunion bearing 13 mounted adjacent the drum outlet 14.

Figure 6B:
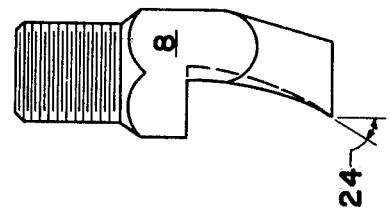
FIG. 6b is a side view of the spray nozzle.
Figure 6A:
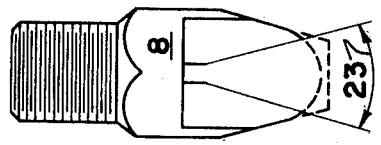
FIG. 6a is a front view of the spray nozzle used to inject the binder fluid into the pelletizer.

In FIGS. 6a and 6b, the spray nozzle 8 emits a flat, wide spray of binder fluid which forms a pattern with spray angle 23 and spray inclination 24. Angle 23 is about 30° and spray inclination 24 is also around 30°.

Figure 7:
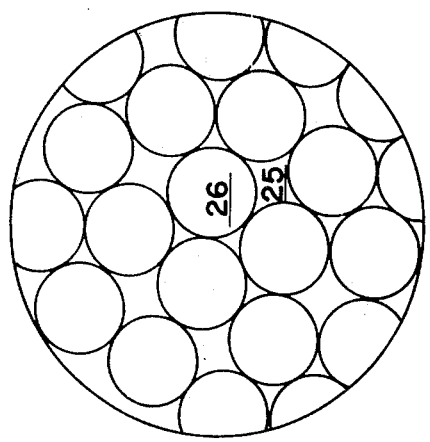
FIG. 7 is a cross-sectional view of conventional pellets.
Figure 8:
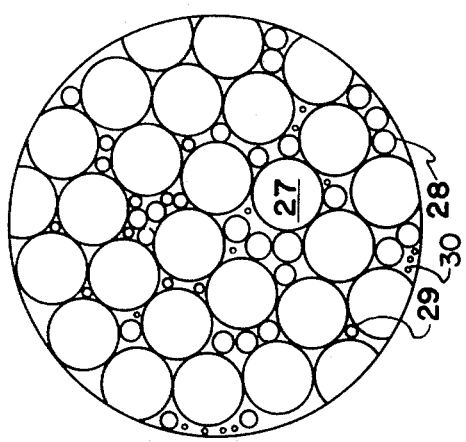
FIG. 8 is a cross-sectional view of pellets produced by the process of the present invention.

In FIGS. 7 and 8, the advantageous pellet size distribution is exhibited, with FIG. 7 showing the prior art uniform size pellets 26 packed in bulk and FIG. 8 showing the pellets 27 of this invention also packed in bulk. The pellets 26 of FIG. 7 have many void spaces 25 between them resulting in a waste of space and also allowing relatively large movements and attrition between the pellets during transportation and handling. FIG. 8 shows how the pellet size distribution of the present invention results in the voids 25 between large pellets 27 being filled with intermediate pellets 28, small pellets 29, and very small pellets 30. Thus FIG. 8 shows how packaging and shipping space is utilized very efficiently and how the close packing of pellets reduces relative movement between them and reduces attrition and fines.

Figure 9:
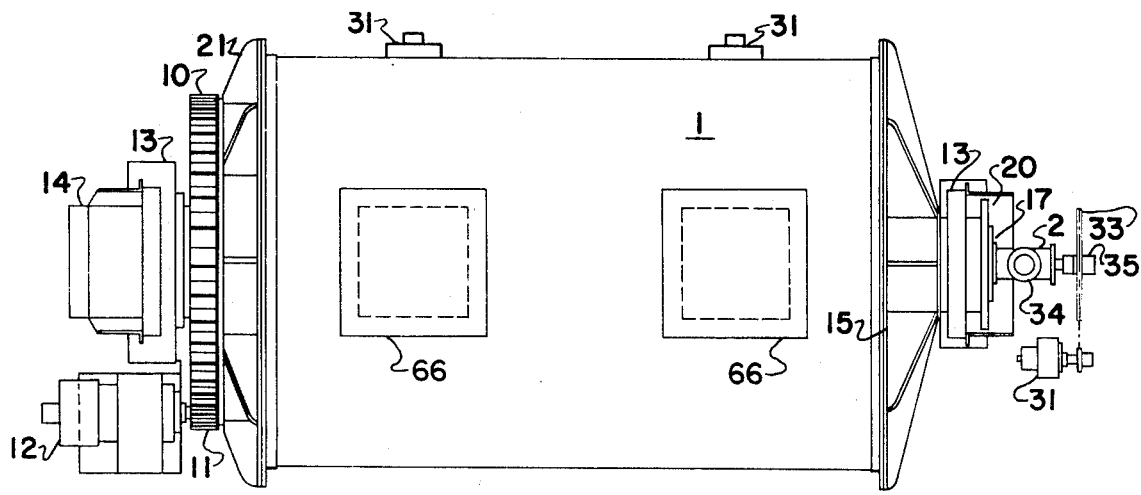
FIG. 9 is a top view of the rotating drum of this invention.

In FIG. 9, the rotating drum 1 has permanently attached to the drum end 21 a driven ring gear 10 which is constantly meshed with driving ring gear 11 on the shaft of driving motor 12. This arrangement provides rotation for the drum. Trunion bearings 13 rotatably support the rotating drum. Pelleted material passes from the drum out outlet section 14 and into pellet conveyor 6. Raw powdered material enters the conveyor 2 at material inlet 34, is conveyed down the conveyor 2 which passes concentrically through the inlet section 15 and into the drum 1. The inlet section 15 is permanently attached to the drum and is also rotatably supported by trunion bearing 13. The conveyor is supported by and attached to conveyor support 20. The shaft 35 of the conveyor is connected to a pulley 33 which is driven by motor 31.

In typical operation, the material to be agglomerated is stored in storage tank 135 and is there allowed to deaerate by settling.

It has been found that deaerating the feed material prior to agglomerating it results in a more compact and desirable pellet and also reduces the amount of fines, since the pellets form faster in the drum with the deaerated material than when it is not deaerated.

From the storage tank 135, the material is conveyed through line 4 to conveyor 2. It is metered by passing it through feeder valve 46. At the outlet end 14 of drum 1, a supply line 56 receives wetting liquid through valve 47 from tank 36 and/on steam from line 44 and feeds this mixture to spray nozzle 8 in the rotating drum 1.

Since the material to be pelletized should contain from 1½ to 5 percent moisture for best results, a pre-wetting supply line 50 is attached to the feeder valve 46 in order to supply moisture to the material if it contains less than 1½ percent moisture. If the material is already sufficiently damp, valve 51 in line 50 can be closed to prevent excess pre-wetting.

The rotating drum is rotated at 6 rpm and material is fed through conveyor 2 and into the drum at approximately 10 tons/hour. A wetting liquid, such as water or steam or both, is sprayed into the curl 19 of the bed of material 18 as it breaks loose from the drum wall and tumbles to the bottom of the drum.

When steam is used with water or by itself, it gives improved wetting ability and results in better pellets which exit the pelletizer at a higher temperature. The use of steam gives a greater spray pressure, finer droplets and mist, and less liquid surface tension. Air or other gases may also be used to aid in atomization. This results in a greater penetration into the bed of material and better dispersion of the liquid throughout the material. Smaller droplets and better dispersion means that a given volume of liquid will go further and provide more even wetting and a tighter control over the moisture content of the material.

The use of steam also provides a convenient method of adding heat to the pellets so that if they are to be dried later, less heat will be required to dry them and they will dry more uniformly. Since heat and moisture travel slowly through the dense agglomerated pellet, drying a cool moist pellet results in drying the outer part of the pellet into a hard shell without removing all of the moisture near the center of the pellet. This process makes the pellet particularly susceptible to breaking. When the pellet is formed at a temperature near the temperature of vaporization of the wetting liquid, and is then dried, very little heat is required in the center of the pellet to vaporize the wetting liquid and remove it from the pellet. Thus the pellet dries uniformly from the inside out and is not case hardened as is the situation when cool wet pellets are heated and dried. When steam is used for pelletizing, a desirable finished pellet temperature is from 65° to 100° C.

Other suitable wetting liquids include one or more of the following: latex, oil, Petro A.G., silanes, stearates, starch, sizing agents, organic materials such as benzene, kerosene, alcohol, etc., organic or inorganic dispersing agents, dispersed and non-dispersed clay and the like.

If a very hard pellet is desired, a binder additive such as molasses or organic liquid can be added to the dry powdered material, or to the wetting liquid supply line. In the alternative, the binder may be sprayed separately in the drum from the wetting liquid.

The drum can be of any dimension depending upon the volume of material to be agglomerated. In one preferred embodiment of this invention the drum has a length of 12 feet and an inner diameter of 10 feet. A throughput of about 250 pounds of material per minute and 25 – 35 pounds of liquid per minute (approximately 3 gallons per minute) gives an effective bed depth of about 8 to 18 inches.

A preferable bed depth when pelletizing clay using steam and water is around 10 inches. At this depth, a particularly desirable pellet size distribution is obtained. A deeper bed depth results in more large pellets and less small pellets.

It is believed that the pellets form in layers or laminations, beginning with a seed or nucleus and gaining a layer each time the pellet is tumbled in the presence of loose wet material or passes through the spray. Thus a deeper bed results in each pellet remaining in contact longer with available loose material. Also a deeper bed results in greater pressure on the pellets as they pass near the bottom of the bed and the result is a harder more compact pellet which may be difficult to disperse.

The production rate of the agglomerating apparatus of the present invention depends upon the size of the drum, the critical speed of rotation of the drum for the type of material used, and the moisture input rate.

The critical speed of the drum appears to be the speed at which the centrifugal force acting upon the material reaches such a magnitude that it interferes with the normal cascading action of the material in the drum. Instead of cascading down upon itself, the bed of material is held against the drum wall longer until it breaks loose and arcs across to the opposite side of the drum causing discontinuities in the normally continuous cascading mass of tumbling material. For the cylindrical drum of this embodiment, pelletizing clay with water and steam, the critical speed is determined by the formula: $RS_c = \sqrt{D}/76.6$, where $RS_c$ is the critical rotational speed and D is the diameter of the drum. With a drum diameter of 10 feet, the critical speed is determined to be 24.2 rpm. In this embodiment of the present invention, a rotational speed of 6 rpm was successfully utilized, which is well below the calculated critical speed. The production rate of the agglomerating apparatus could thus be increased considerably by increasing the drum speed from 6 rpm to any speed below 24.2 rpm.

The drum can be heated near the outlet end in order to dry the completely formed pellets. The preferred maximum moisture level of the material in the drum is from 10 – 18 percent and this "moisture level" can be of any of the wetting liquids given above or any combination of them.

A coating such as epoxy resin or epoxy paint may be applied to the parts of the apparatus which come into contact with the material being pelleted in order to eliminate the possibility of contamination of the material.

Pellets of "predispersed" clay may be produced in the present invention by including a sufficient amount of a commercially known clay dispersant such as one of the polyphosphates or polysilicates, in the dry clay, in a prewetting tank, in the main spray 8, in the drum or in any combination of these locations. A more uniform distribution of the dispersant is obtained by mixing it in the wetting liquid added through supply line 50 and feeder valve 46 and, subsequently, and in the spray from nozzle 8.

The wetting liquid may be divided into two streams and sprayed from two different spray nozzles at different locations in the drum. If the sprays are placed in tandem, an even greater reduction in dusting is achieved in the drum since the downstream spray wets down the dust not wetted down by the upstream spray.

A second spray may be used entirely for spraying a dispersant, binder, or any other additive onto the material with the first spray only wetting the material. The dispersant or binder additive spray may be upstream or downstream from the wetting spray in the pelletizing drum.

In lieu of or addition to adding a wetting spray, a seeded bed may be utilized in pelletizing the material. Part of the pellets formed may be broken down and recirculated to the upstream end of the drum to seed the incoming material.

Figure 10:
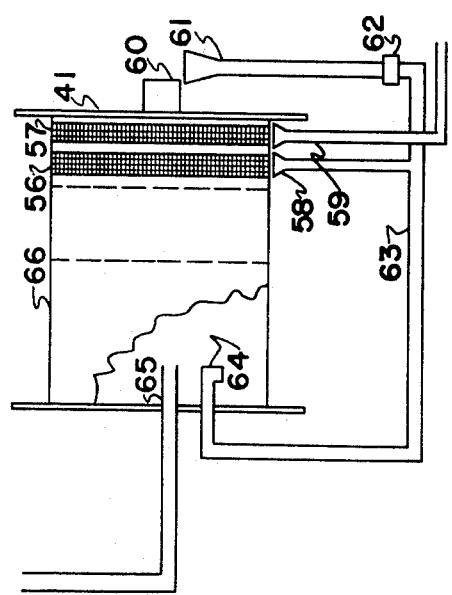
FIG. 10 is a schematic diagram of a further embodiment of the present invention.

In FIG. 10, an alternative drum configuration is shown which utilizes an integral classification system built into the drum 66. In the discharge end 41 of the drum 66, part of the drum shell has been replaced by bands of screen material 56 and 57, passing entirely around the circumference of the drum. Screen section 56 contains a tight-mesh screen (such as, for example a 40 mesh screen) for allowing only fines or very small pellets to drop out of the drum and be collected in funnel 58. The screen 57 is a large mesh screen (such as, for example, a 5 mesh screen) which allows the desirable pellets to drop out into funnel 59. Pellets and lumps which will not pass through either screen are discharged through outlet 60 into funnel spout 61. The large lumps collected in funnel 61 are passed to a crusher 62 which breaks the large pellets and lumps into small seeds and dumps them into conveyor means 63 which carries these seeds and the fines from funnel 58 into the drum and out discharge spout 64 located near the incoming stream of finely divided material entering through conventional conveyor 65. The finely crushed lumps and small pellets serve as seeds or nuclei for the incoming material and aid in the initiation of agglomeration of the material.

In using wet pelleting by adding a liquid, a typical moisture content in a material such as clay to obtain any pelletizing in the rotating drum appears to be on the order of 12 percent.

If heat is applied to the drum 1 in order to dry the pellets, the minimum amount of wetness in the final dried pellet should be above 1% with a preferable wetness level of 3 to 5 percent for maximum dispersibility of the material into other compounds such as paper or rubber. The temperature of the pellets leaving the heated drum should be around 65° – 100° C. and the pellets should exhibit a spherically shaped form with a semi-polished surface.

A pellet formed in accord with the present invention when cut in half reveals a small central nucleus and shells or laminations built upon that nucleus. These laminations are believed to be due to the wetting spray contacting the loose material in the vicinity of the pellet. Each time the spray hits the area near the pellet, another lamination on the pellet results.

Heat can be applied to the drum by any conventional method such as external gas heaters or equivalents such as electrical resistance heaters or jets or hot gases directed at the drum.

Finished and dried pellets exit the drum at outlet 14 and pass into a pellet conveying system 6 whereby they are transferred to storage vessels.

While manufacturers usually require the pelleted material to be substantially dry, some materials will flow freely when pelletized by this process even though they may contain up to 18 percent moisture.

Since a clay pellet with less than 3 percent moisture is difficult to disperse for many applications such as paper, etc., the clay pellets must contain between 3 to 5 percent moisture to be acceptable to many purchasers. Yet it was found that by pelletizing clay using the present invention, there is not any discernible reason for drying the pellets. In fact, it is advantageous not to do so. Pellets containing as high as 18 percent moisture manufactured by the process of this invention were extremely free flowing and do not adhere to one another when stored nor break when handled normally. In addition, these free flowing moist pellets are easily dispersed in other products or into an aqueous slurry due to their relatively high moisture content.

It has been found that the preferred pellet size distribution for maximum packing efficiency and minimum loss to fines through attrition is as follows:

| Size Mesh Screen | % of Pellets |
|---|---|
| + 5 | 25 – 55% |
| – 5 to + 10 | 30 – 55% |
| – 10 to + 20 | 5.0 – 25% |
| – 20 to + 40 | 0.5 –5.0% |
| – 40 | less than 2% |

The interpretation of this distribution is that from 25 to 55 percent of the pellets will not pass through a No. 5 mesh screen (largest openings), 30 to 55 percent of the pellets will pass through a 5 mesh screen but not through a 10 mesh screen (slightly smaller openings), 5 to 25 percent will pass through the 5 and 10 mesh screens but not through a 20 mesh screen, 0.5 to 5 percent will pass through the 5, 10, and 20 mesh screens but not through a 40 mesh screen, and less than 2 percent will pass through all the screens including the 40 mesh. The fraction passing through all the screens, considered as fines, may be considered undesirable because of the difficulty in handling the particles, although the fines still consist primarily of small pellets, with very little dusty unpelleted material.

In pelleting powdered or finely divided materials such as clay or pigments, the above pellet size distribution range will provide a pellet distribution that has high volumetric density with free flowing properties.

This gradation of pellets exhibits a lack of any tendency to bridge and is extremely free flowing and free of dust. Although they are not unacceptable, pellets above 5 mesh in size and below 40 mesh in size should be avoided in order to obtain the highest packing density and less attrition. The optimum range of pellet sizes is between 5 mesh and 40 mesh and it is often desirable to have over 50 percent of the pellets in this range.

While the prior art devices, such as pin mixers or rotating tilted pans, can pelletize within this range, the pellets produced are often undesirable because of their low density, low compaction and their uniformity in size. These characteristics give the pellets a lower bulk or pour density than those of the present invention.

Another desirable feature of the present invention involves the ball-mill type of action the larger pellets exert upon the small pellets when the pelleted material is being dispersed into slurry or another product. This ball-mill action aids in breaking down the small pellets and therefore eases dispersion of the material into the final products.

In four different pelletizing runs, the above described methods and apparatus provided uniform semi-polished pellets of good dispersibility and attrition resistance and well within the preferred range of pellet size distribution. The table below gives the results of the pelletizing runs.

of wetting liquid added in the drum and the amount of heat applied to the downstream end of the drum.

It has been found in general that, within limits, an increase in the moisture added has the effect of increasing the proportion of large size pellets produced and thus increasing the bulk density up to the point of diminishing returns based on sizing and breakage factors.

An increase in the speed of revolution of the pelletizing drum has, in general, the effect of increasing the number of small size pellets and tends somewhat to decrease the bulk density.

To control bed depth and retention time in the drum, the drum can be tilted from inlet end to outlet end by raising one end or the other. By raising the inlet end of the drum with respect to the outlet end, retention time will be shortened. Raising the outlet end higher than the inlet end lengthens the retention time.

Figure 12:
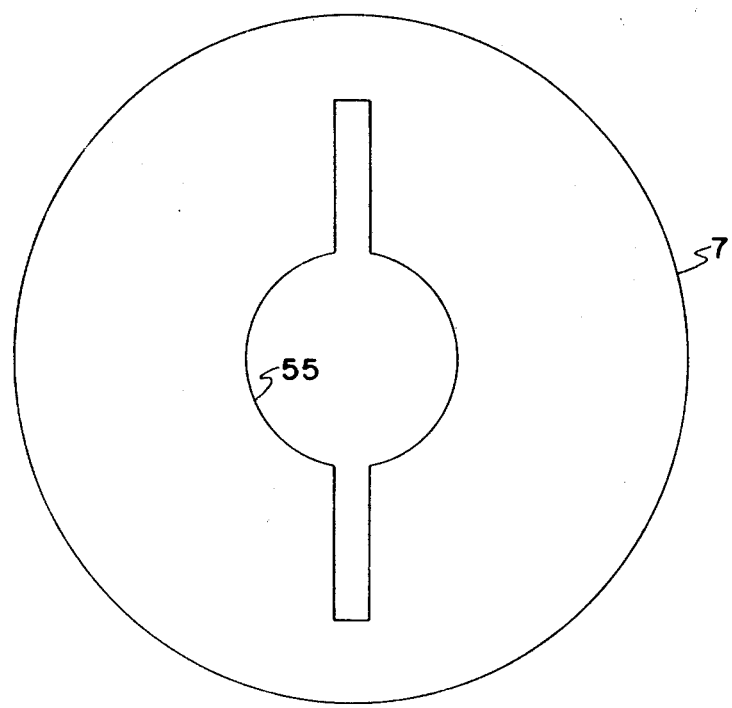
FIG. 12 is a cross-section of the drum taken at section line B—B in FIG. 1 and in the direction indicated.
Figure 11:
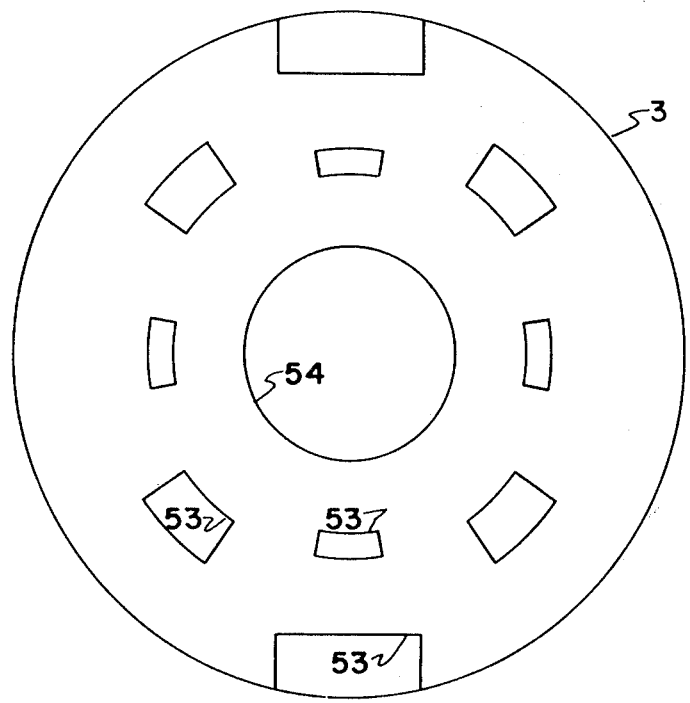
FIG. 11 is a cross-sectional view of the drum taken at section line A—A in FIG. 1 and in the direction indicated.

Bed depth can be controlled closely by enlarging or closing off the openings in the baffles within the drum. In FIGS. 11 and 12, the baffles which divide the drum into three compartments are visible. In FIG. 11, baffle 3 is shown having openings 53 placed equi-distant around the baffle. These openings as well as the central opening 54 allow the material being pelletized to pass from the pelletizing compartment 39 into the polishing compartment 40. Increasing the size or number of any or all of these openings lowers the effective bed depth by allowing the material to pass down the length of the drum quicker. Bed depth is also changed by moving the openings radially inward or outward on the baffle, with bed depth decreasing as the openings are moved radially outward on the baffle, towards the drum shell.

In FIG. 12, baffle 7 is visible, which is the baffle divid-

TABLE I

| Mesh Size | Run 1 (%) | Run 2 (%) | Run 3 (%) | Run 4 (%) | Run 5 (%) |
|---|---|---|---|---|---|
| +5 | 34.8 | 30.6 | 42.1 | 47.0 | 39.1 |
| −5 to +10 | 50.3 | 46.4 | 43.2 | 41.1 | 44.1 |
| −10 to +20 | 13.2 | 19.9 | 12.8 | 9.4 | 15.0 |
| −20 to +40 | 1.1 | 2.1 | 1.3 | 1.8 | 1.3 |
| −40 | 0.6 | 1.0 | 0.6 | 0.7 | 0.5 |
| Bulk Density | 61.1lbs./ft$^3$ | 65.4lbs./ft$^3$ | 64.2lbs./ft$^3$ | 64.3lbs./ft$^3$ | 63.1lbs./ft$^3$ |
| Material rate | 250lbs./min. | 250lbs./min. | 250lbs./min. | 250lbs./min. | 250lbs./min. |
| % Moisture | 10.4 | 12.5 | 12.6 | 13.0 | 13.2 |
| Drum rpm | 6 | 6 | 6 | 5 | 6 |
| Type Wetting Liquid | Steam and water | Steam and water | Steam and water | Steam and water | Steam and water |
| Type Material | Clay | Clay | Clay | Clay | Clay |
| Drum Diameter | 10 ft. | 10 ft. | 10 ft. | 10 ft. | 10 ft. |
| Drum Length | 12 ft. | 12 ft. | 12 ft. | 12 ft. | 12 ft. |

The variables involved include the bulk density, the pellet size distribution, maximum and minimum size of the pellets, pellet hardness, and moisture level in the finished pellet. The bulk density and pellet size distribution are directly related to the material through-put rate, drum size and speed of rotation, the type of material pelleted, the amount of wetting liquid added in the drum, the type of wetting liquid used, the tilt of the rotating drum, if any, the bed depth of material in the drum, and the position of the spray in the drum. The maximum and minimum size of the pellets depend mainly on the type of material to be pelleted, the type of wetting liquid used, and the retention time in the drum. Pellet hardness is dependent upon the type of material pelleted and the type of wetting liquid used. Pellet hardness is also dependent upon bed depth since the deeper the bed of material, the greater the pressure upon the pellets in the bottom of the bed and the greater compaction attained. Pellet wetness depends upon the amount ing the polishing compartment from the discharge compartment. Bed depth in the polishing compartment depends upon both the baffles, 3 and 7. If the openings in baffle 3 are increased to lower bed depth in the pelleting compartment, the opening 55 in baffle 7 must likewise be enlarged to maintain a lower bed depth in the polishing compartment.

In the discharge compartment are lifters 42 which pick up the finished pellets as the drum rotates and funnels them out through the outlet. If the bed depth is to be lowered by enlarging the openings in baffles 3 and 7 then the size or number of lifters 42 must also be increased.

The through-put rate in the drum can also be varied by tilting the drum, enlarging the baffle openings, and increasing the number of lifters. A constant bed depth can be maintained while the through-put rate is varied just as in the above alteration, bed depth can be changed while maintaining a constant through-put rate.

Retention time is a function of drum length and diameter, tilt of the drum, if any, and bed depth in the drum. Bed depth also depends upon the rate of material input into the drum.

The advantages enjoyed by the present invention over the prior art devices include the greater bulk densities attainable, a more freely flowing pelleted product, an almost total absence of fines and dust resulting in less loss and less contamination, and a pelleted product which is easily dispersed in other compounds.

The material passing through the apparatus is completely pelletized and substantially all dust is removed from the material. While there are still "fines" in the pelleted material, these are small pellets rather than dust and are not objectionable. No sizing of the pellets is required since the finished pellets of this invention fall within the desired range for optimum packing density and ease of dispersion. The present invention eliminates the need for classifying the pellets and eliminates the need for dust removal apparatus.

When loaded in railroad hopper cars, a clay pelleted by the process of this invention flowed out through the discharge spouts at the bottom of the hopper cars at the rate of 1 ton per minute, without the aid of vibrators, air pads, or hammers. There was a total absence of dust during the unloading. A non-pelletized clay was unloaded at a rate of one-sixteenth of the above using vibrators and air pads.

When loaded in boxcars, material such as clay must be unloaded by front end loaders which are basically small tractors with raisable scoops on the front. Unloading a clay pelleted by this invention was quick and convenient while unloading a non-pelleted clay was slow and dirty due to the heavy dusting occurring.

In addition, the boxcar containing the pelleted clay contained more than twice as much clay per unit volume than did the boxcar of unpelleted clay, meaning lower shipping costs for the pelleted clay.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. For example, the drum of the present invention can be level or tilted. The drum may be of any convenient length and diameter. Water can be used as a wetting liquid as can steam or both; various binder additives such as molasses can be added to the water, and other wetting liquids such as oils or organic liquids can be substituted for water. The drum can also be used for dry pelletization using the seeded bed principle whereby a portion of the finished pellets are crumbled and refed back into the unpelletized material to provide seeds or nuclei for newly forming pellets. The inner surface of the drum may be smooth, rough, or may have fins or lifters attached to it to agitate the bed of material. Also, more than one spray can be utilized in the drum and a commercially available dispersant can be added to the material or to the wetting liquid or to a separate spray to provide a "predispersed" product, such as predispersed kaolin clay. Additional clay of the same or other types may be added in slurry form to that being pelletized by the spray. The drum can be heated near its outlet end by gas or electric heaters or can be used without heating. As will be noted the present invention substantially reduces the "dusting problem". In the absence of the present invention it is not uncommon to lose 3 to 6 percent of the material shipped to the atmosphere. This invention has particular advantages for export shipments where density is of the greatest importance and multiple handling is required. The invention is declared to cover all changes and modifications of the specific example of the invention herein disclosed for purposes of illustration, which do not constitute departures from the spirit and scope of the invention.

We claim:

1. Apparatus for agglomerating finely divided materials such as clay, silica, or silicate pigments into a range of pellet sizes providing optimum density, packing efficiency, and attrition resistance, comprising:
   a. a rotatable drum for receiving finely divided material and tumbling it until it is agglomerated;
   b. pellet initiation means located within said rotatable drum for spraying liquid wetting agent, in a flat wide spray, on the finely divided material for encouraging it to agglomerate;
   c. input conveying means passing into said rotatable drum for introducing finely divided material into said drum, said input conveying means including a screw conveyor comprising a non-rotatable shell and a rotatable shaft, and being connected to said rotatable drum by lubricated bushings;
   d. inlet means opening into one end of said drum and attached to said conveying means for receiving said finely divided material to be agglomerated;
   e. outlet means opening into the opposite end of said rotatable drum for receiving the agglomerated material from said drum;
   f. pellet conveying means located at said outlet means for conveying the discharged agglomerated material away from said drum;
   g. pre-wetting means attached to said input conveying means for adding from 0 to 5 percent wetting liquid to said finely divided material;
   h. first motor means attached to said rotatable drum for providing rotary motion to said drum;
   i. second motor means attached to said input conveyor means for providing conveyor drive power to said input conveyor means.
   j. a first baffle within said drum for dividing said drum into compartments;
   k. a second baffle within said drum between said first baffle and said outlet means for further dividing said drum into compartments; and,
   l. a plurality of lifter trays located radially in said drum between said second baffle and said outlet means for lifting the pelleted material and funneling it out of said drum.

* * * * *

UNITED STATES PATENT AND TRADEMARK OFFICE
CERTIFICATE OF CORRECTION

PATENT NO. : 4,050,869
DATED : September 27, 1977
INVENTOR(S) : Robert B. Takewell et al.

It is certified that error appears in the above-identified patent and that said Letters Patent are hereby corrected as shown below:

Column 1, line 6, "now abandoned. And, which" should be
-- now abandoned, and which --.

Column 4, line 30, following "bed 18" the word "when" should be -- where --.

Column 4, lines 51-52, "The conveyor system 1" should be
-- The conveyor system 2 --.

Column 6, line 62, the formula "$RS_c = \sqrt{D}/76.6$" should be
-- $RS_c = 76.6/\sqrt{D}$ --.

Column 7, line 23, following "subsequently," the word "and" should be omitted.

*Signed and Sealed this*

*Thirty-first* Day of *January 1978*

[SEAL]

Attest:

RUTH C. MASON
*Attesting Officer*

LUTRELLE F. PARKER
*Acting Commissioner of Patents and Trademarks*